US008031203B2

(12) United States Patent
Kawashima et al.

(10) Patent No.: US 8,031,203 B2
(45) Date of Patent: Oct. 4, 2011

(54) IMAGE PROCESSING APPARATUS AND IMAGE PROCESSING METHOD

(75) Inventors: Hidetoshi Kawashima, Ebina (JP); Yasunari Kishimoto, Ashigarakami-gun (JP); Ryosuke Higashikata, Ashigarakami-gun (JP); Yasuki Yamauchi, Ashigarakami-gun (JP); Akihiro Ito, Ebina (JP); Noriko Hasegawa, Ebina (JP); Yousuke Tashiro, Ebina (JP); Kiyoshi Une, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 846 days.

(21) Appl. No.: 12/021,800

(22) Filed: Jan. 29, 2008

(65) Prior Publication Data
US 2008/0204775 A1 Aug. 28, 2008

(30) Foreign Application Priority Data
Feb. 22, 2007 (JP) .................................. 2007-042247

(51) Int. Cl.
| | |
|---|---|
| G09G 5/00 | (2006.01) |
| G09G 5/02 | (2006.01) |
| H04N 1/60 | (2006.01) |
| H04N 1/46 | (2006.01) |
| G06K 9/00 | (2006.01) |
| G06K 9/40 | (2006.01) |
| G03F 3/08 | (2006.01) |
| G06K 9/32 | (2006.01) |
| H04N 5/445 | (2006.01) |

(52) U.S. Cl. ........ 345/604; 345/590; 345/593; 345/601; 345/549; 348/557; 348/560; 348/630; 358/518; 358/523; 382/162; 382/167; 382/254; 382/274

(58) Field of Classification Search .......... 345/427–428, 345/581, 589–590, 591, 593, 600–601, 603–604, 345/619, 549; 348/557, 560, 562, 599, 630, 348/692; 358/518–519, 523–524; 382/162–167, 382/254, 274, 276
See application file for complete search history.

(56) References Cited

U.S. PATENT DOCUMENTS
2003/0016862 A1   1/2003   Ohga
(Continued)

FOREIGN PATENT DOCUMENTS
JP   A-11-045325   2/1999
(Continued)

OTHER PUBLICATIONS
May 10, 2011 Notice of Reasons for Rejection issued in Japanese Patent Application No. 2007-042247 with translation.

*Primary Examiner* — Wesner Sajous
(74) *Attorney, Agent, or Firm* — Oliff & Berridge, PLC

(57) ABSTRACT

In an image processing apparatus, a first conversion unit converts, on the basis of an input device profile, input data into first device-independent data expressed by a color space that is independent of an apparatus. A storage unit stores plural conversion profiles for converting using a color appearance model in the color space that is independent of the apparatus in correspondence with plural device characteristics that are dependent on apparatuses. A selection unit selects a conversion profile corresponding to characteristics of the input device, characteristics of an output device, observation conditions of the input data and the output data. A second conversion unit converts, on basis of the selected conversion profile, the first device-independent data into second device-independent data. A third conversion unit converts the second device-independent data into the output data on the basis of an output device profile.

19 Claims, 7 Drawing Sheets

U.S. PATENT DOCUMENTS

| | | |
|---|---|---|
| 2005/0078122 A1* | 4/2005 | Ohga ............................ 345/589 |
| 2005/0169519 A1 | 8/2005 | Minakuti et al. |
| 2005/0249403 A1 | 11/2005 | Haikin |
| 2006/0001892 A1* | 1/2006 | Bai ................................ 358/1.9 |
| 2006/0250623 A1 | 11/2006 | Newman et al. |
| 2007/0076260 A1* | 4/2007 | Upton ........................... 358/3.21 |
| 2009/0052771 A1* | 2/2009 | Ohga ............................ 382/165 |
| 2009/0244557 A1* | 10/2009 | Itagaki .......................... 358/1.6 |
| 2010/0328693 A1* | 12/2010 | Itagaki .......................... 358/1.9 |

FOREIGN PATENT DOCUMENTS

| | | |
|---|---|---|
| JP | A-2000-050086 | 2/2000 |
| JP | A 2005-210526 | 8/2005 |
| JP | A-2005-318491 | 11/2005 |
| JP | A-2006-078794 | 3/2006 |
| WO | WO 2005/109318 A2 | 11/2005 |

* cited by examiner

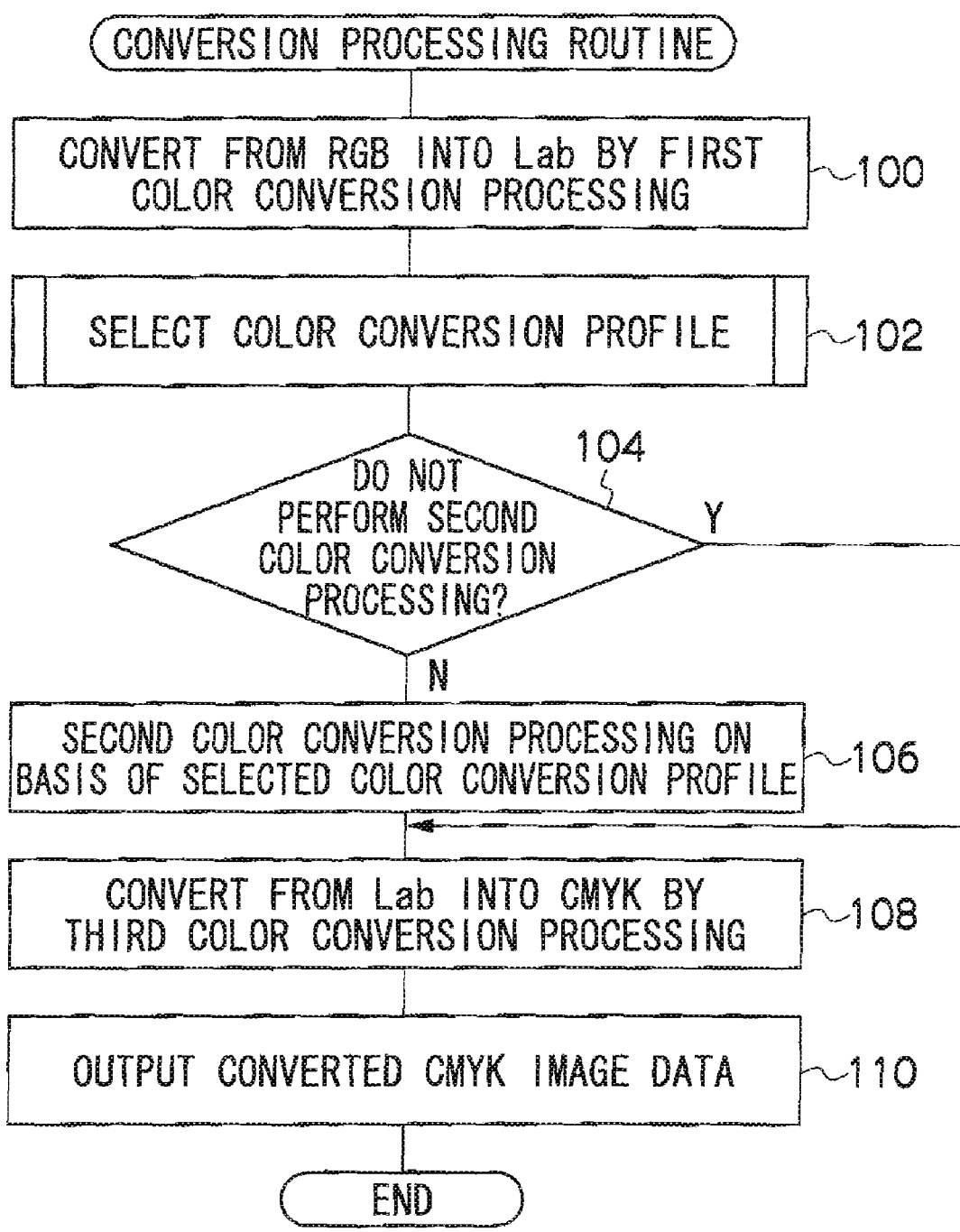

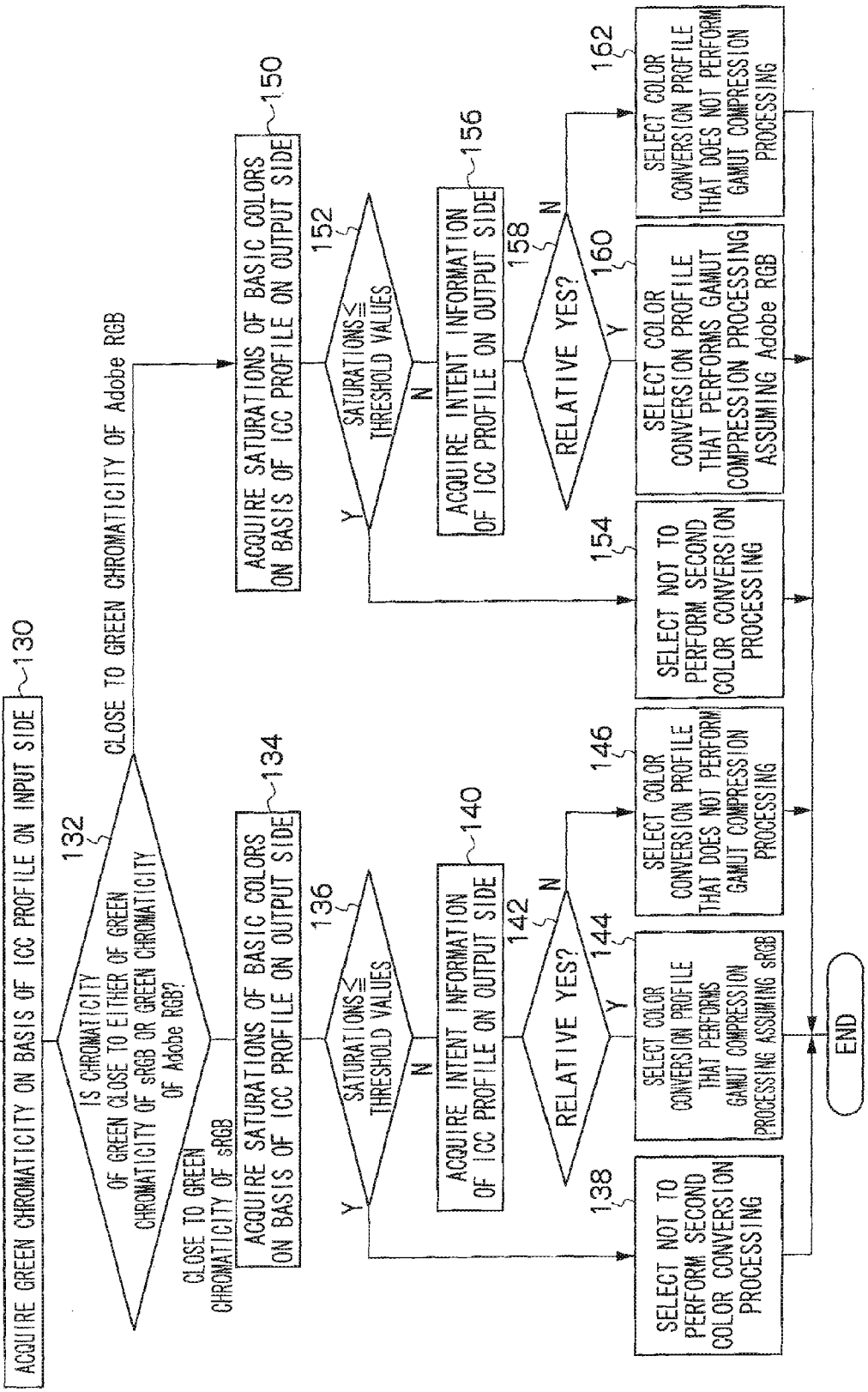

FIG. 7

| No. | ICC PROFILE ON INPUT SIDE | ICC PROFILE ON OUTPUT SIDE | | COLOR CONVERSION PROFILE | INTENT SELECTED BY THIRD COLOR CONVERSION PROCESSING |
|---|---|---|---|---|---|
| | GAMUT | GAMUT SIZE | INTENT | | |
| 1 | sRGB | LARGE | RELATIVE:YES | GAMUT COMPRESSION(sRGB) | RELATIVE |
| 2 | sRGB or AdobeRGB | LARGE | RELATIVE:NO | NO GAMUT COMPRESSION | PERCEPTUAL |
| 3 | AdobeRGB | LARGE | RELATIVE:YES | GAMUT COMPRESSION(Adobe RGB) | RELATIVE |
| 4 | sRGB or AdobeRGB | SMALL | — | NO PROCESSING | PERCEPTUAL |

IMAGE PROCESSING APPARATUS AND IMAGE PROCESSING METHOD

CROSS-REFERENCE TO RELATED APPLICATION

This application is based on and claims priority under 35 USC 119 from Japanese Patent Application No. 2007-042247 filed Feb. 22, 2007.

BACKGROUND

1. Technical Field

The present invention relates to an image processing apparatus and an image processing method, and in particular to an image processing apparatus and an image processing method that use a color appearance model to convert image data such that color appearances become the same.

2. Related Art

In recent years, there have been provided technologies that use color appearance models including the CIECAM02 color appearance model, for example, to convert image data such that the appearances of color expressed by a certain gamut and color expressed by a different gamut become the same.

Further, systems are also known which utilize International Color Consortium (ICC) profiles to convert colors expressed by RGB used on a monitor, for example, into colors for expression by CMYK used in printing. However, systems that utilize ICC profiles are not based on the assumption of handling color appearance models (excluding color adaptation), so there are problems in handling color appearance models.

SUMMARY

In consideration of the above circumstances, the present invention provides an image processing apparatus and an image processing method.

According to an aspect of the invention, there is provided an image processing apparatus including a first conversion unit that converts, on the basis of an input device profile corresponding to characteristics of an input device, input data into first device-independent data expressed by a color space that is independent of an apparatus; a storage unit in which there are stored, on the basis of observation conditions representing environments in which the input data and output data outputted on the basis of the input data are observed, the characteristics of the input device and characteristics of an output device, and in correspondence with a plurality of device characteristics that are dependent on apparatuses, a plurality of conversion profiles for converting using a color appearance model such that color appearances of the input data and the output data become the same in the color space that is independent of the apparatus; a selection unit that selects, from the plurality of conversion profiles stored in the storage unit, a conversion profile corresponding to the characteristics of the input device, the characteristics of the output device, the observation condition of the input data and the observation condition of the output data; a second conversion unit that converts, on the basis of the conversion profile selected by the selection unit, the first device-independent data converted by the first conversion unit into second device-independent data; and a third conversion unit that converts the second device-independent data converted by the second conversion unit into the output data on the basis of an output device profile corresponding to the characteristics of the output device.

BRIEF DESCRIPTION OF THE DRAWINGS

Exemplary embodiments of the present invention will be described in detail based on the following figures, wherein:

FIG. 5 is a flowchart showing the content of a conversion processing routine in the client PC pertaining to the exemplary embodiments of the present invention;

FIG. 6 is a flowchart showing the content of a profile selection processing routine in the client PC pertaining to the exemplary embodiments of the present invention; and FIG. 7 is a table showing color conversion profiles selected by the profile selection processing routine.

DETAILED DESCRIPTION

Below, exemplary embodiments of the present invention will be described with reference to the drawings. It will be noted that in these exemplary embodiments, a case will be described where the present invention is applied to a printing system.

Figure 1:
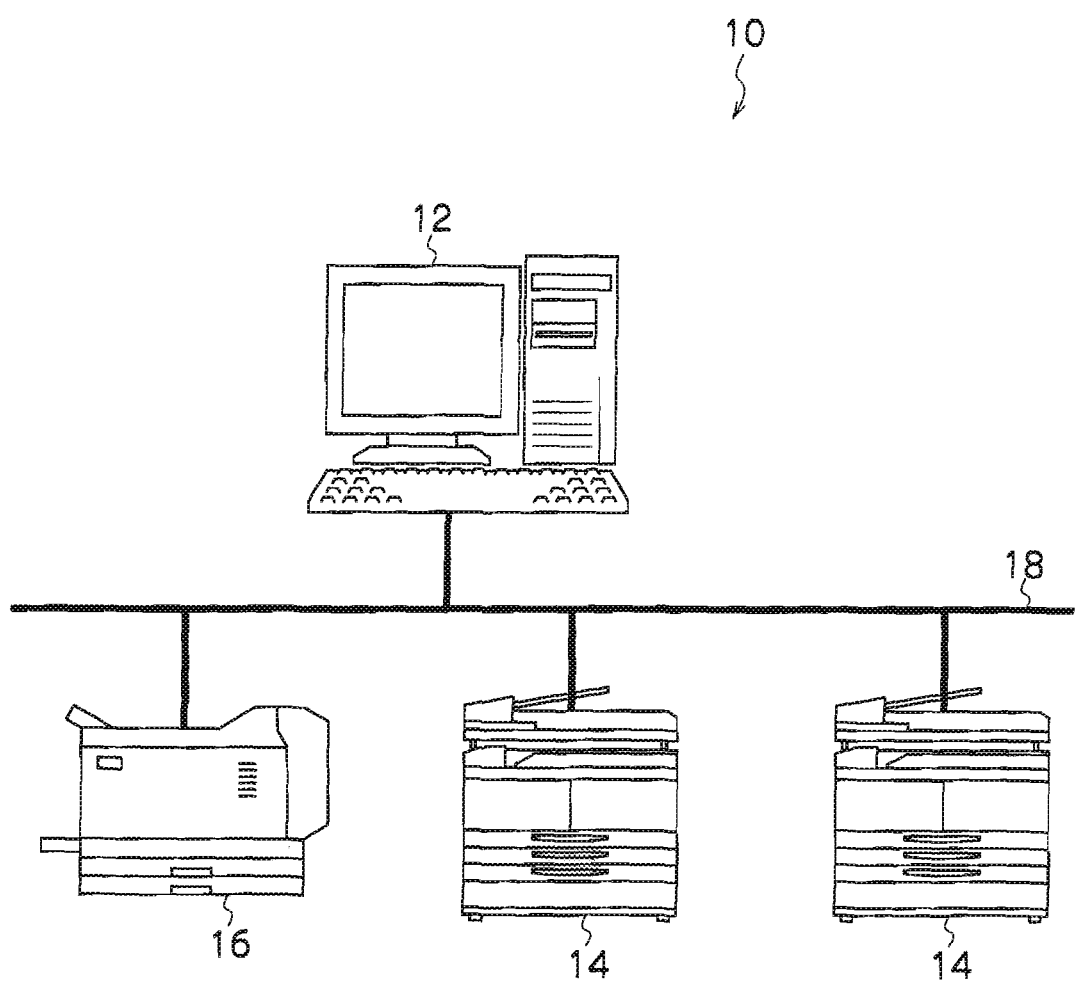
FIG. 1 is a general diagram showing the configuration of a printing system pertaining to the exemplary embodiments of the present invention.

As shown in FIG. 1, a printing system 10 pertaining to a first exemplary embodiment of the present invention is configured by a client PC 12, copiers 14, a printer 16, and a network 18 such as a local area network (LAN). The client PC 12, the copiers 14 and the printer 16 are interconnected via the network 18.

Figure 2:
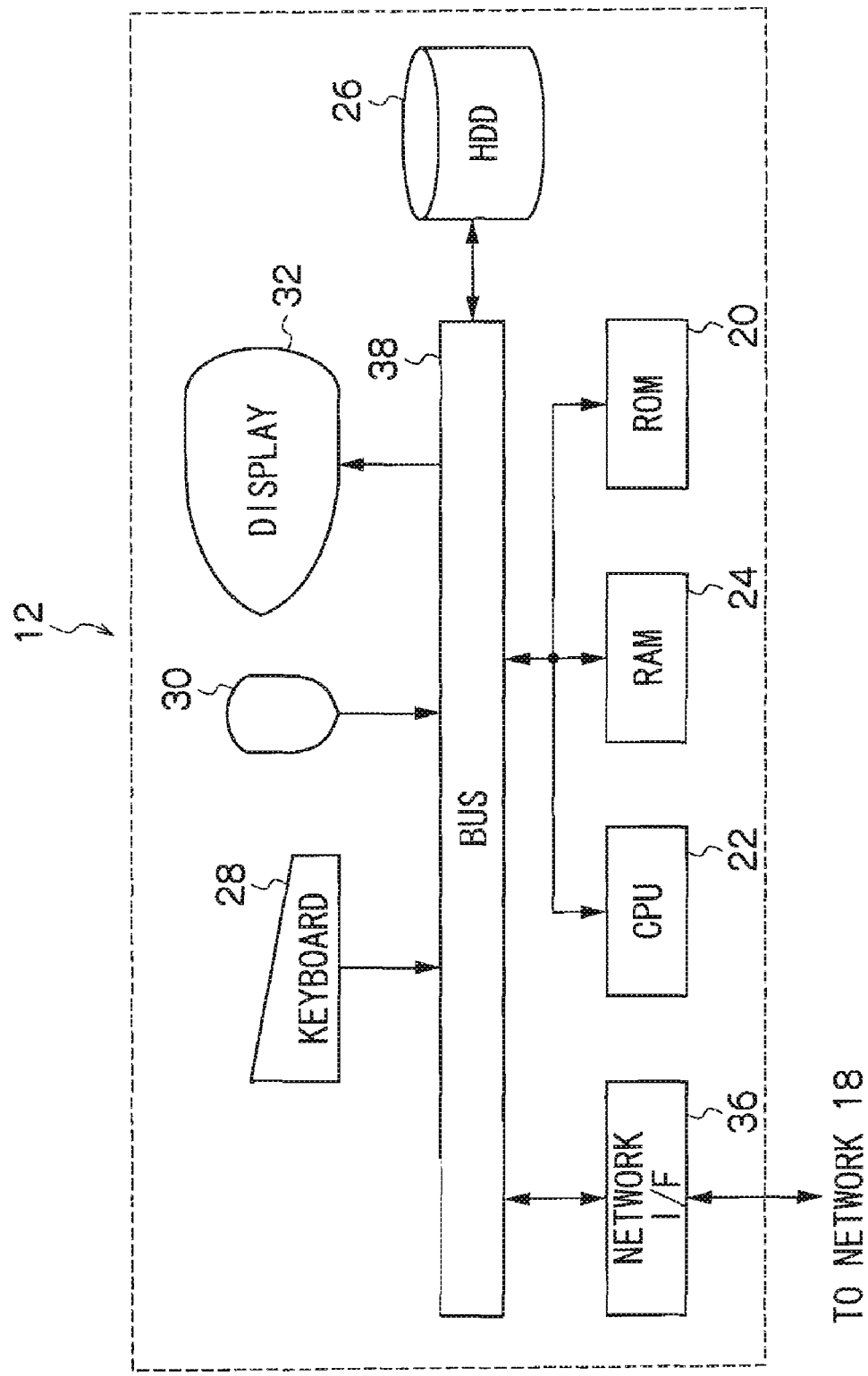
FIG. 2 is a block diagram showing the configuration of a client PC pertaining to the exemplary embodiments of the present invention.

Further, as shown in FIG. 2, the client PC 12 is disposed with a ROM 20 in which various types of programs and parameters are stored, a CPU 22 that executes various types of programs, a RAM 24 that is used as a work area during execution of various types of programs by the CPU 22, a HDD 26 in which image data and a program for executing a later-described conversion processing routine are stored, a keyboard 28, a mouse 30, a display 32, a network interface 36 for connecting to the network 18, and a bus 38 for interconnecting these.

Further, it suffices for the copiers 14 to have a common configuration of conventionally known copiers such as scanners and printing units. In the present exemplary embodiment, description of the configuration of the copiers 14 and common processing will be omitted. Further, it suffices for the printer 16 to have a common configuration of conventionally known printers. In the present exemplary embodiment, description of the configuration of the printer 16 and common processing will be omitted.

Figure 3:
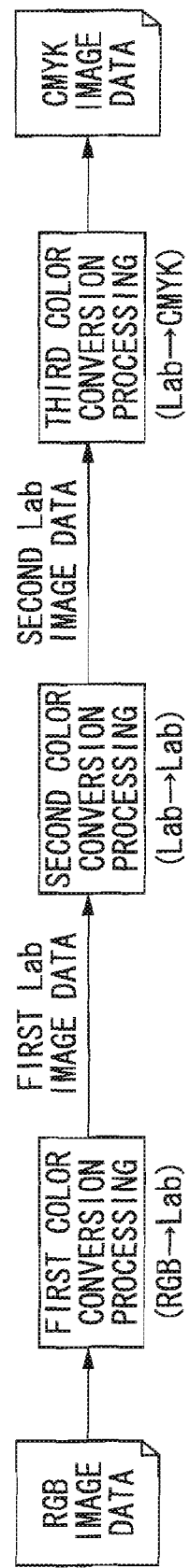
FIG. 3 is a block diagram showing the content of color conversion processing of color image data.

Next, color conversion processing of color image data executed by the client PC 12 will be described using FIG. 3. First, RGB image data that are color image data of an RGB color space for display on the display are inputted. Then, on the basis of an ICC profile on the input side that has been prepared beforehand or an ICC profile on the input side that has been attached to the inputted RGB data, the RGB image data of the RGB color space are converted by first color conversion processing into first Lab image data of a Lab color space that is independent of the apparatus. A profile corresponding to the gamut of the RGB image data is used as the ICC profile on the input side.

Then, on the basis of a color conversion profile in the Lab color space that takes into consideration a color appearance model (CAM), the first Lab image data are converted by second color conversion processing into second Lab image data.

In third color conversion processing that follows, on the basis of an ICC profile on the output side that has been prepared beforehand, the second Lab image data are converted into CMYK image data that are color image data of a CMYK color space for output by the copiers 14 and the printer 16. A profile corresponding to the gamut of the CMYK image data that become output is used as the ICC profile on the output side.

Plural color conversion profiles corresponding to plural gamuts (sRGB (standard RGB) and Adobe RGB) that are dependent on the display are prepared beforehand in the client PC 12 as color conversion profiles used in the second color conversion processing and stored in the HDD 26. Here, methods of creating these plural color conversion profiles will be described using FIGS. 4A and 4B.

Figure 4A:
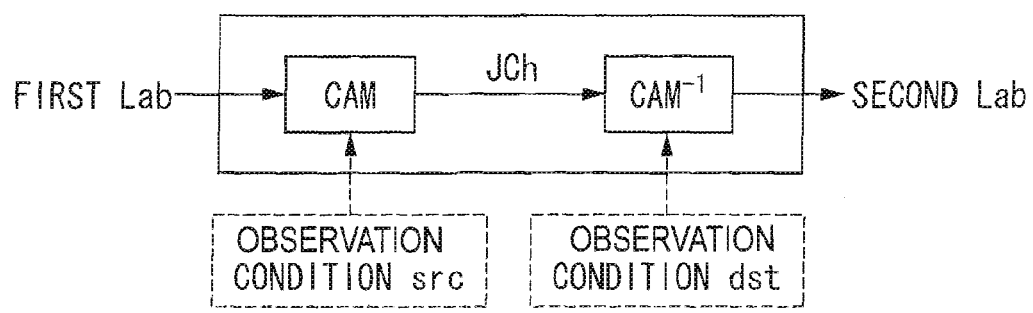
FIGS. 4A and 4B are schematic diagrams showing methods of creating a color conversion profile.

First, a color conversion profile when the gamut is not to be compressed in color conversion processing will be described. As shown in FIG. 4A, a color conversion profile is created. The first Lab image data are converted by CAM conversion using an observation condition on the input side into JCh data that are independent of the observation environment. The JCh data are converted by CAM reverse conversion using an observation condition on the output side into the second Lab image data. As parameters of the observation condition on the input side and the observation condition on the output side, there are, for example, tristimulus values of white in an adaptive visual field, average luminance of an adaptive visual field, relative luminance of a background field, and constants determined by a conditions of a surrounding region, but the parameters are not limited to these. Further, a predetermined observation condition may also be set beforehand; for example, as the observation condition on the input side, an observation environment of a display in a lighting environment of a common office may be set.

Figure 4B:
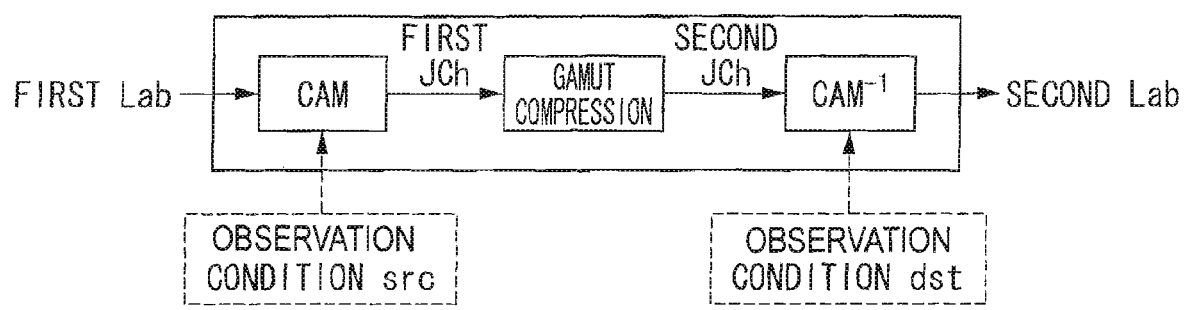

Further, when it is necessary to compress the gamut in color conversion processing, then a color conversion profile is created as shown in FIG. 4B. The first Lab image data are converted by CAM conversion using an observation condition on the input side into first JCh data that are independent of the observation environment. The first JCh data are converted into second JCh data by gamut compression processing. The second JCh data are converted into the second Lab image data by CAM reverse conversion using an observation condition on the output side. Gamut compression processing is processing that predetermines, as a standard gamut, gamuts including the gamuts of common printers and compresses the gamut into this predetermined gamut.

In the present exemplary embodiment, a color conversion profile that does not perform the gamut compression processing described in FIG. 4A, a color conversion profile that performs gamut compression processing assuming that the gamut of the input device is sRGB, and a color conversion profile that performs gamut compression processing assuming that the gamut of the input device is Adobe RGB are stored beforehand in the HDD 26.

Next, the action of the first exemplary embodiment will be described. In the present exemplary embodiment, an example will be described where RGB image data created by the client PC 12 are printed by one of the copiers 14.

First, in the client PC 12, when an instruction that causes the copier 14 to print an image displayed on the display is given by a user, then a conversion processing routine shown in FIG. 5 is executed.

First, in step 100, on the basis of the profile of the input device attached to the image, the aforementioned first color conversion processing is performed to convert the RGB image data serving as input image data into the first Lab image data. In step 102, on the basis of the observation conditions on the input side and the output side, the profile on the input side and the profile on the output side, a color conversion profile suitable for the gamut of the input device and gamut information and intent information serving as characteristics of the profile on the output side is selected from among the plural color conversion profiles stored in the HDD 26. Below, a profile selection processing routine for realizing step 102 will be described using FIG. 6.

First, in step 130, the chromaticity of green, for example, of the ICC profile on the input side is acquired. In step 132, it is determined whether the acquired green chromaticity is close to either of a green chromaticity of Adobe RGB or a green chromaticity of sRGB. When it is determined that the acquired green chromaticity is close to the green chromaticity of sRGB, then it is judged that the gamut of the input device color space is close to sRGB. In step 134, the Lab values of basic colors C 100%, M 100%, Y 100%, R (Y 100%+M 100%), G (Y 100%+C 100%) and B (M 100%+C 100%) are acquired on the basis of the ICC profile on the output side. In step 136, the saturations C* of the Lab values are calculated, and it is determined whether or not the saturations C* are equal to or less than predetermined threshold values that have been determined beforehand in correspondence to the saturations C*. For these threshold values, saturations judged to be a gamut size where the effect of a CAM is small are set in regard to the output device color space. Further, in regard to the ICC profile on the output side, ICC profiles corresponding to outputting devices are prepared beforehand, and an ICC profile corresponding to the copiers 14 or the printer 16 serving as the target of printing instruction is selected as the ICC profile on the output side.

In step 136, when the saturations C* are equal to or less than the threshold values, it is judged that there will be little effect even if color conversion processing using a CAM is performed because the size of the gamut of the output device color space is small. In step 138, not to perform the second color conversion processing is selected, and the profile selection processing routine ends.

On the other hand, in step 136, when any of the saturations C* is larger than its threshold value, it is judged that there will be an effect of color conversion processing using a CAM. In step 140, intent information of the ICC profile on the output side is acquired. In step 142, it is determined whether or not relative (relative represents relative colorimetric) intent is included in the intent information acquired in step 140. When there is relative intent (minimum color difference), then in step 144, a color conversion profile that performs gamut compression processing assuming that the gamut of the input device color space is sRGB is selected, and the profile selection processing routine ends. On the other hand, when there is not relative intent, then the intent selected by the third color conversion processing becomes perceptual and gamut compression becomes performed in the third color conversion processing. For that reason, in step 146, a color conversion profile that does not perform gamut compression processing is selected, and the profile selection processing routine ends.

Further, in step 132, when it is determined that the acquired green chromaticity is close to the green chromaticity of Adobe RGB, then it is judged that the gamut of the input device is close to Adobe RGB. In step 150, the Lab values of basic colors C, M, Y, R, G and B are acquired on the basis of the ICC profile on the output side. In step 152, the saturations C* of the Lab values are calculated, and it is determined whether or not the saturations C* are equal to or less than threshold values that have been determined beforehand in correspondence to the saturations C*.

In step 152, when the saturations are equal to or less than the threshold values, it is judged that there will be little effect even if color conversion processing using a CAM is performed. In step 154, not to perform the second color conversion processing is selected, and the profile selection processing routine ends.

On the other hand, in step 152, when any of the saturations C* is larger than its threshold value, then in step 156, intent information of the ICC profile on the output side is acquired. In step 158, it is determined whether or not relative intent is included in the intent information acquired in step 156. When there is relative intent, then in step 160, a color conversion profile that performs gamut compression processing assuming that the gamut of the input device is Adobe RGB is selected, and the profile selection processing routine ends. On the other hand, when there is not relative intent, then a color conversion profile that does not perform gamut compression processing is selected, and the profile selection processing routine ends.

By executing the profile selection processing routine as described above, as shown in FIG. 7, when the gamut of the input device is close to sRGB, the size of the gamut of the output device is large, and relative intent is present in the intent information of the ICC profile on the output side, then a color conversion profile that compresses from sRGB to a standard gamut by gamut compression processing is selected (see the case of No. 1 in FIG. 7).

Further, when the gamut of the input device is sRGB or Adobe RGB, the size of the gamut of the output device is large, and relative intent (minimum color difference) is not present (but there is perceptual intent) in the intent information of the ICC profile on the output side, then a conversion parameter that the ICC profile itself on the output side has is compressed, and when gamut compression processing is performed by the second color conversion processing, then compression processing becomes performed two times over and image quality drops. For that reason, a color conversion profile that does not perform gamut compression processing is selected (the case of No. 2 in FIG. 7).

Further, when the gamut of the input device is close to Adobe RGB, the size of the gamut of the output device is large, and relative intent is present in the intent information of the ICC profile on the output side, then a color conversion profile that compresses from Adobe RGB to a standard gamut by gamut compression processing is selected (see the case of No. 3 in FIG. 7).

Further, when the size of the gamut of the output device is small, then there is virtually no effect of CAM conversion. For that reason, a color conversion profile is not selected, and not to perform the second color conversion processing is selected (see the case of No. 4 in FIG. 7).

In the present exemplary embodiment, a profile corresponding to a gamut of sRGB and Adobe RGB is prepared as the input device color space, but the profile is not limited to this. Further, plural observation conditions on the input side and the output side may also be assumed, and profiles corresponding to those may also be prepared beforehand.

Then, in step 104 of the conversion processing routine, it is determined whether not to perform the second color conversion processing has been selected in step 102. When not to perform the second color conversion processing has been selected, then the routine moves to step 108. When a color conversion profile for the second color conversion processing has been selected, then in step 106, the second color conversion processing is performed on the basis of the selected color conversion profile. The first Lab image data that were converted in step 100 are converted to the second Lab image data.

In step 108 that follows, the third color conversion processing is performed on the basis of the ICC profile on the output side, whereby the second Lab image data that were converted in step 106 are converted to the CMYK image data. It will be noted that, when not to perform the second color conversion processing has been selected in step 102, then the first Lab image data are converted to the CMYK image data. Further, in the third color conversion processing, as shown in FIG. 7, a intent is selected in accordance with the ICC profile on the input side and the ICC profile on the output side.

Then, in step 110, the CMYK image data that were converted in step 108 are outputted to the copier 14 as printing data, and the conversion processing routine ends.

Then, the copier 14 prints an image on recording paper on the basis of the CMYK image data outputted from the client PC 12.

As described above, according to the printing system pertaining to the first exemplary embodiment, plural color conversion profiles corresponding to plural gamuts and the observation conditions on the input side and the output side are stored in the HDD, a color conversion profile is selected in accordance with the gamut of the input device, and conversion is performed such that the color appearances of RGB image data that become input and CMYK image data that become output become the same in a Lab color space that is independent of the apparatus.

Further, a suitable color conversion profile is selected in accordance with the type of intent included in the ICC profile on the output side. Thus, color conversion processing in which a color appearance model is reflected may be performed.

Further, when the size of the gamut of the output device is small and an effect cannot be obtained even if conversion in which a color appearance model is reflected is performed, then the second color conversion processing in which a color appearance model is reflected is omitted.

Further, a color conversion profile that takes into consideration the observation condition and gamut and in which a color appearance model is reflected is selected, and the second color conversion processing is performed. For that reason, existing ICC profiles may be used as the ICC profile on the input side and the ICC profile on the output side.

There is a large difference in the chromaticity of green between sRGB and Adobe RGB. For that reason, the gamut of the input device may be judged on the basis of the chromaticity of green determined from the ICC profile on the input side.

Further, the size of the gamut of the output device may be judged on the basis of the saturations of the basic colors determined from the ICC profile on the output side.

In the preceding exemplary embodiment, an example has been described where the color conversion processing is performed in the client PC, but the color conversion processing may also be performed by the printer or the copiers. In this case, the conversion processing routine may be executed in the copiers or the printer with respect to RGB image data inputted from the client PC.

Further, an example has been described where sRGB or Adobe RGB is assumed as the gamut of the input device, but the gamut is not limited to this. For example, the gamut may also one that has been customized by an adjustment function of the display.

Next, a second exemplary embodiment will be described. The configuration of the printing system pertaining to the second exemplary embodiment is the same as that of the first exemplary embodiment, so the same reference numerals will be used and description relating to configuration will be omitted.

The second exemplary embodiment is different from the first exemplary embodiment in that there are prepared plural color conversion profiles corresponding to plural gamut compression methods.

In the printing system pertaining to the second exemplary embodiment, a color conversion profile that does not perform gamut compression processing, a color conversion profile that assumes that the gamut of the input device is sRGB, and a color conversion profile that assumes that the gamut of the input device is Adobe RGB are prepared as color conversion profiles used in the second color conversion processing. The color conversion profile that assumes that the gamut of the input device is sRGB and performs gamut compression processing and the color conversion profile that assumes that the gamut of the input device is Adobe RGB are plurally prepared in correspondence to gamut compression methods of brightness preservation, color hue preservation and minimum color difference. These files are stored in the HDD 26 of the client PC 12.

Additionally, the user designates, in the client PC 12, the gamut compression method from any of brightness preservation, color hue preservation and minimum color difference. In the conversion processing routine, the second color conversion processing is performed on the basis of the color conversion profile corresponding to the designated gamut compression method.

Next, a third exemplary embodiment will be described. The configuration of the printing system pertaining to the third exemplary embodiment is the same as that of the first exemplary embodiment, so the same reference numerals will be used and description relating to configuration will be omitted.

The third exemplary embodiment is different from the first exemplary embodiment in that there are prepared plural color conversion profiles where the sizes of the output gamuts of gamut compression processing are different.

In the printing system pertaining to the third exemplary embodiment, a color conversion profile that does not perform gamut compression processing, a color conversion profile that assumes that the gamut of the input device is sRGB, and a color conversion profile that assumes that the gamut of the input device is Adobe RGB are prepared as color conversion profiles used in the second color conversion processing. Further, the color conversion profile that assumes that the gamut of the input device is sRGB and performs gamut compression processing and the color conversion profile that assumes that the gamut of the input device is Adobe RGB are plurally prepared for each size of output gamuts. These files are stored in the HDD 26 of the client PC 12.

Additionally, in the conversion processing routine, the size of the gamut of the output device is calculated on the basis of the ICC profile on the output side, a color conversion profile corresponding to a category of the calculated gamut size is selected, and the second color conversion processing is performed on the basis of the selected color conversion profile.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An image processing apparatus comprising:
a first conversion unit that converts, on the basis of an input device profile corresponding to characteristics of an input device, input data into first device-independent data expressed by a color space that is independent of an apparatus;
a storage unit in which there are stored, on the basis of observation conditions representing environments in which the input data and output data outputted on the basis of the input data are observed, the characteristics of the input device and characteristics of an output device, and in correspondence with a plurality of device characteristics that are dependent on apparatuses, a plurality of conversion profiles for converting using a color appearance model such that color appearances of the input data and the output data become the same in the color space that is independent of the apparatus;
a selection unit that selects, from the plurality of conversion profiles stored in the storage unit, a conversion profile corresponding to the characteristics of the input device, the characteristics of the output device, the observation condition of the input data and the observation condition of the output data;
a second conversion unit that converts, on the basis of the conversion profile selected by the selection unit, the first device-independent data converted by the first conversion unit into second device-independent data; and
a third conversion unit that converts the second device-independent data converted by the second conversion unit into the output data on the basis of an output device profile corresponding to the characteristics of the output device.

2. The image processing apparatus of claim 1, wherein the storage unit stores the plurality of conversion profiles in correspondence with a plurality of characteristics of the input device profile and the output device profile, and the selection unit selects a conversion profile corresponding to the characteristics of the input device profile and the characteristics of the output device profile.

3. The image processing apparatus of claim 2, wherein the characteristics of the input device profile include a color space of the input device, and the plurality of conversion profiles are stored in correspondence to a plurality of color spaces.

4. The image processing apparatus of claim 3, wherein it is determined that the color space of the input device is sRGB or Adobe RGB by determining whether the chromaticity of an input green is close the chromaticity of green of sRGB or close to the chromaticity of green of Adobe RGB, and the plurality of conversion profiles include a conversion profile for use when it is determined that the color space is sRGB and a conversion profile for use when it is determined that the color space is Adobe RGB.

5. The image processing apparatus of claim 2, wherein the plurality of conversion profiles are further stored in correspondence to gamut compression methods, each of the methods being selected from brightness preservation, color hue preservation, or minimum color difference.

6. The image processing apparatus of claim 2, wherein the characteristics of the output device profile are gamut size and type of intent included in the output device profile.

7. The image processing apparatus of claim 6, wherein the type of intent comprises "relative colorimetric", and the plurality of conversion profiles further include a conversion profile that performs gamut compression processing for when "relative colorimetric" is included in the output device profile and a conversion profile that does not perform gamut compression processing for when "relative colorimetric" is not included in the output device profile.

8. The image processing apparatus of claim 1, further comprising
a calculation unit that calculates the size of the gamut of the output device, and
a determination unit that determines whether or not the size of the gamut calculated by the calculation unit is equal to or less than a predetermined size, wherein
the second conversion unit performs conversion based on the conversion profile when the size of the gamut calculated by the calculation unit is more than the predetermined size, and
the third conversion unit converts the first device-independent data into the output data on the basis of the output device profile when the conversion based on the conversion profile has not been performed by the second conversion unit.

9. The image processing apparatus of claim 8, wherein the size of the gamut of the output device is calculated by saturations of basic colors.

10. The image processing apparatus of claim 1, wherein a color space of the input device is RGB, the color space that is independent of the apparatus is Lab, and a color space of the output device is CMYK.

11. The image processing apparatus of claim 1, wherein the color conversion profile is created such that the observation condition representing the environment in which the input data are observed is used to convert the first device-independent data into observation condition-independent data and such that the observation condition representing the environment in which the output data are observed is used to convert the observation condition-independent data into the second device-independent data.

12. The image processing apparatus of claim 11, wherein the color conversion profile is further created such that the observation condition-independent data are converted into second observation condition-independent data by gamut compression processing.

13. The image processing apparatus of claim 11, wherein the observation condition-independent data comprise JCh data.

14. The image processing apparatus of claim 1, wherein the input device profile and the output device profile are ICC profiles.

15. An image processing method of an image processing apparatus comprising a storage unit in which there are stored, on the basis of observation conditions representing environments in which input data and output data outputted on the basis of the input data are observed, characteristics of an input device and characteristics of an output device, and in correspondence with a plurality of device characteristics that are dependent on apparatuses, a plurality of conversion profiles for converting using a color appearance model such that color appearances of the input data and the output data become the same in a color space that is independent of an apparatus, the method comprising:
    converting, on the basis of an input device profile corresponding to the characteristics of the input device, the input data into first device-independent data expressed by the color space that is independent of the apparatus;
    selecting, from the plurality of conversion profiles stored in the storage unit, a conversion profile corresponding to the characteristics of the input device, the characteristics of the output device, the observation condition of the input data and the observation condition of the output data;
    converting, on the basis of the selected conversion profile, the converted first device-independent data into second device-independent data; and
    converting the converted second device-independent data into the output data on the basis of an output device profile corresponding to the characteristics of the output device.

16. The image processing method of claim 15, wherein
    the storage unit stores the plurality of conversion profiles in correspondence with a plurality of predetermined characteristics of the input device profile and the output device profile, and
    the selecting comprises selecting a conversion profile corresponding to the characteristics of the input device profile and the characteristics of the output device profile.

17. The image processing method of claim 15, wherein the characteristics of the output device profile are gamut size and type of intent included in the output device profile.

18. The image processing method of claim 15, further comprising
    calculating the size of the gamut of the output device, and
    determining whether or not the calculated size of the gamut is equal to or less than a predetermined size, wherein
        when the calculated size of the gamut is more than the predetermined size, the conversion based on the conversion profile is performed, and
        when the conversion based on the conversion profile has not been performed, the first device-independent data is converted into the output data on the basis of the output device profile.

19. An image processing apparatus comprising:
    first conversion means for converting, on the basis of an input device profile corresponding to characteristics of an input device, input data into first device-independent data expressed by a color space that is independent of an apparatus;
    storage means for storing, on the basis of observation conditions representing environments in which the input data and output data outputted on the basis of the input data are observed, the characteristics of the input device and characteristics of an output device, and in correspondence with a plurality of device characteristics that are dependent on apparatuses, a plurality of conversion profiles for converting using a color appearance model such that color appearances of the input data and the output data become the same in the color space that is independent of the apparatus;
    selection means for selecting, from the plurality of conversion profiles stored in the storage means, a conversion profile corresponding to the characteristics of the input device, the characteristics of the output device, the observation condition of the input data and the observation condition of the output data;
    second conversion means for converting, on the basis of the conversion profile selected by the selection means, the first device-independent data converted by the first conversion means into second device-independent data; and
    third conversion means for converting the second device-independent data converted by the second conversion means into the output data on the basis of an output device profile corresponding to the characteristics of the output device.

* * * * *